US008959104B2

(12) United States Patent
Lazier et al.

(10) Patent No.: US 8,959,104 B2
(45) Date of Patent: Feb. 17, 2015

(54) PRESENTING QUERY SUGGESTIONS BASED UPON CONTENT ITEMS

(75) Inventors: Ariel J. Lazier, Seattle, WA (US); Hugh E. Williams, Remond, WA (US); Timothy C. Hoad, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1317 days.

(21) Appl. No.: 12/077,793

(22) Filed: Mar. 21, 2008
(Under 37 CFR 1.47)

(65) Prior Publication Data
US 2009/0240683 A1 Sep. 24, 2009

(51) Int. Cl.
*G06F 17/30* (2006.01)

(52) U.S. Cl.
CPC .... *G06F 17/30646* (2013.01); *G06F 17/30864* (2013.01)
USPC .................... 707/766; 707/765; 707/E17.014

(58) Field of Classification Search
CPC combination set(s) only.
See application file for complete search history.

(56) References Cited

U.S. PATENT DOCUMENTS

| | | | |
|---|---|---|---|
| 6,496,838 B1 * | 12/2002 | Zamora-McKelvy et al. | ............................ 707/640 |
| 6,671,681 B1 | 12/2003 | Emens | |
| 7,051,023 B2 | 5/2006 | Kapur | |
| 7,069,254 B2 | 6/2006 | Foulger | |
| 7,181,447 B2 | 2/2007 | Curtis | |
| 7,523,099 B1 * | 4/2009 | Egnor et al. | ......................... 1/1 |
| 7,720,791 B2 * | 5/2010 | Hyder et al. | ................. 705/7.14 |
| 2006/0085391 A1 | 4/2006 | Turski | |
| 2006/0167857 A1 | 7/2006 | Kraft | |
| 2006/0190436 A1 | 8/2006 | Richardson | |
| 2006/0248078 A1 | 11/2006 | Gross | |
| 2006/0259861 A1 | 11/2006 | Watson | |
| 2007/0078828 A1 | 4/2007 | Parikh | |
| 2007/0088686 A1 | 4/2007 | Hurst-Hiller | |
| 2008/0082486 A1 * | 4/2008 | Lermant et al. | ................... 707/3 |
| 2009/0106224 A1 * | 4/2009 | Roulland et al. | ................. 707/5 |

OTHER PUBLICATIONS

Kraft, Reiner et al., Mining Anchor Text for Query Refinement, IBM Almaden Research Center, San Jose, California, pp. 1-9, http://delivery.acm.org/10.1145/990000/9887631p666-kraft.pdf?key1=988763&key2=6115306811&coll=GUIDE&dl=GUIDE&CFID=25643812&CFTOKEN=15574427.

Davison, Brian D. et al., Finding Relevant Website Queries, Department of Computer Science & Engineering, Lehigh University, Bethlehem, Pennsylvania, pp. 103, http://www2003.org/cdrom/papers/poster/p308/p308-davison.html.

White, Ryen W. et al., Studying the Use of Popular Destinations to Enhance Web Search Interaction, SIGIR '07, Jul. 23-27, 2007, Amsterdam, The Netherlands, pp. 1-8, http://research.microsoft.com/~ryenw/papers/WhiteSIGIR2007a.pdf.

* cited by examiner

*Primary Examiner* — Shyue Jiunn Hwa
(74) *Attorney, Agent, or Firm* — Ben Tabor; David Andrews; Micky Minhas (57) ABSTRACT

Systems and methods for determining query suggestions based upon content items are provided. Content items may include, without limitation, a search query result item, e.g., displayed on a search results web page, an advertisement, and a query-based query suggestion. Once determined content-item-based query suggestions are presented to the user. If desired, such presentation may be dynamically exposed in response to a user action, for instance, in response to a user hovering over a portion of the associated content item for at least a predetermined period of time.

19 Claims, 8 Drawing Sheets

PRESENTING QUERY SUGGESTIONS BASED UPON CONTENT ITEMS

BACKGROUND

In recent years, the quantity of information available on the web has grown considerably which has led to the development of advanced search technologies to enable a user to find relevant content. Generally, this technology has focused on finding content on the web related to a query that a user has issued. More recently, search technologies have begun to offer query suggestions based upon the originally input query. In this regard, query suggestions may be described as other queries a user may be interested in issuing in order to find better results for their original query or related to their original query.

BRIEF SUMMARY

Embodiments of the present invention relate to systems and methods for determining query suggestions based upon content items. Content items may include, without limitation, a search query result item (e.g., displayed on a search results web page), an advertisement, and a query-based query suggestion. Once determined, content-item-based query suggestions are presented to the user. If desired, such presentation may be dynamically exposed in response to a user action, for instance, in response to a user hovering over a portion of the associated content item for at least a predetermined period of time.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide systems and methods for determining and presenting query suggestions that are based upon content items, for instance, a search query result item, an advertisement, or a query-based query suggestion (i.e., a query suggestion based solely on an originally input search query). Content-item-based query suggestions are suggested queries, based upon one or more particular content items associated with a web page and not solely on an originally input search query, that may lead to something (e.g., a search result or other content item) in which a user may be interested. In this regard, if at least one of the content items on which content-item-based query suggestions are based is a search result item, the content-item-based query suggestions may be provided as more focused alternatives to an originally input search query and/or as more focused alternatives to a query-based query suggestion. Further, if at least one of the content items on which content-item-based query suggestions are based is an advertisement or product/service-related content item, the content-item-based query suggestions may be provided as alternatives to provide access to more focused information directed to the advertised/described product or service or similar-type products/services. Still further, if at least one of the content items on which the content-item-based query suggestions are based is any other type of informational content item (e.g., biographical information about a person of interest, entertainment-related facts, map data, etc.), the content-item-based query suggestions may be provided as alternatives to provide access to more focused information directed to the particular informational content item. It will be understood by those of ordinary skill in the art that the options listed herein are exemplary only and not exhaustive. Content-item-based query suggestions may be based upon any arbitrary content associated with a web page, client application, mobile application, or computer operating system, within the scope of embodiments of the present invention.

If desired, presentation of content-item-based query suggestions may be static or may be dynamically exposed in response to detected or determined user actions, for instance, in response to a user hovering over a portion of the associated content item for at least a predetermined period of time. Exemplary user interface features related to exposure of content-item-based query suggestions and exemplary user actions that may result in such exposure are more fully described below with reference to FIGS. 4-8.

Having briefly described an overview of the present invention, an exemplary operating environment for the present invention is now described. Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of components/modules illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. Embodiments of the present invention may be practiced in a variety of system configurations, including hand-held devices, consumer electronics, general-purpose computers, specialty computing devices, etc. Embodiments of the invention may also be practiced in distributed computing environments where tasks are performed by remote-processing devices that are linked through a communications network.

Figure 1:
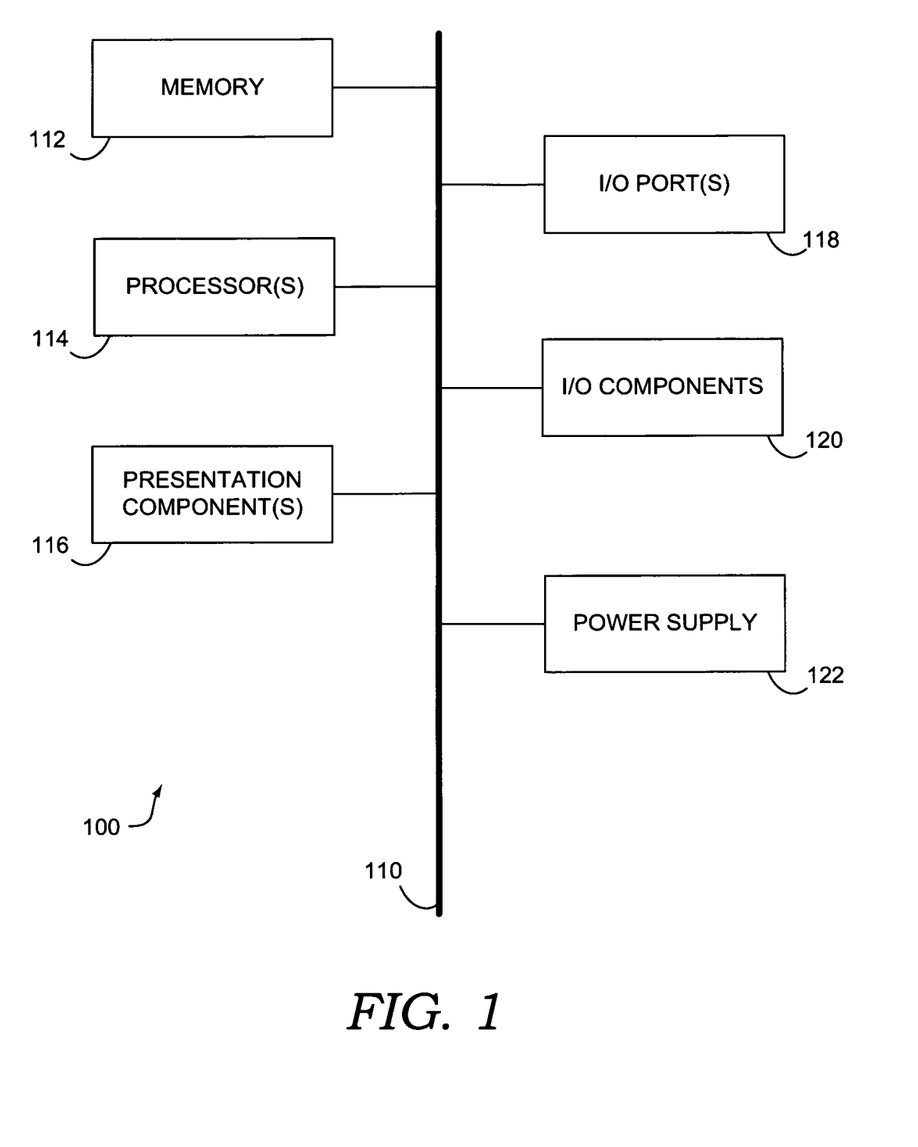
FIG. 1 is a block diagram of an exemplary computing environment suitable for use in implementing the present invention.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider an presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computer" or "computing device."

Computer 110 typically includes a variety of computer-readable media. Computer-readable media can be any available media that can be accessed by computer 110 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
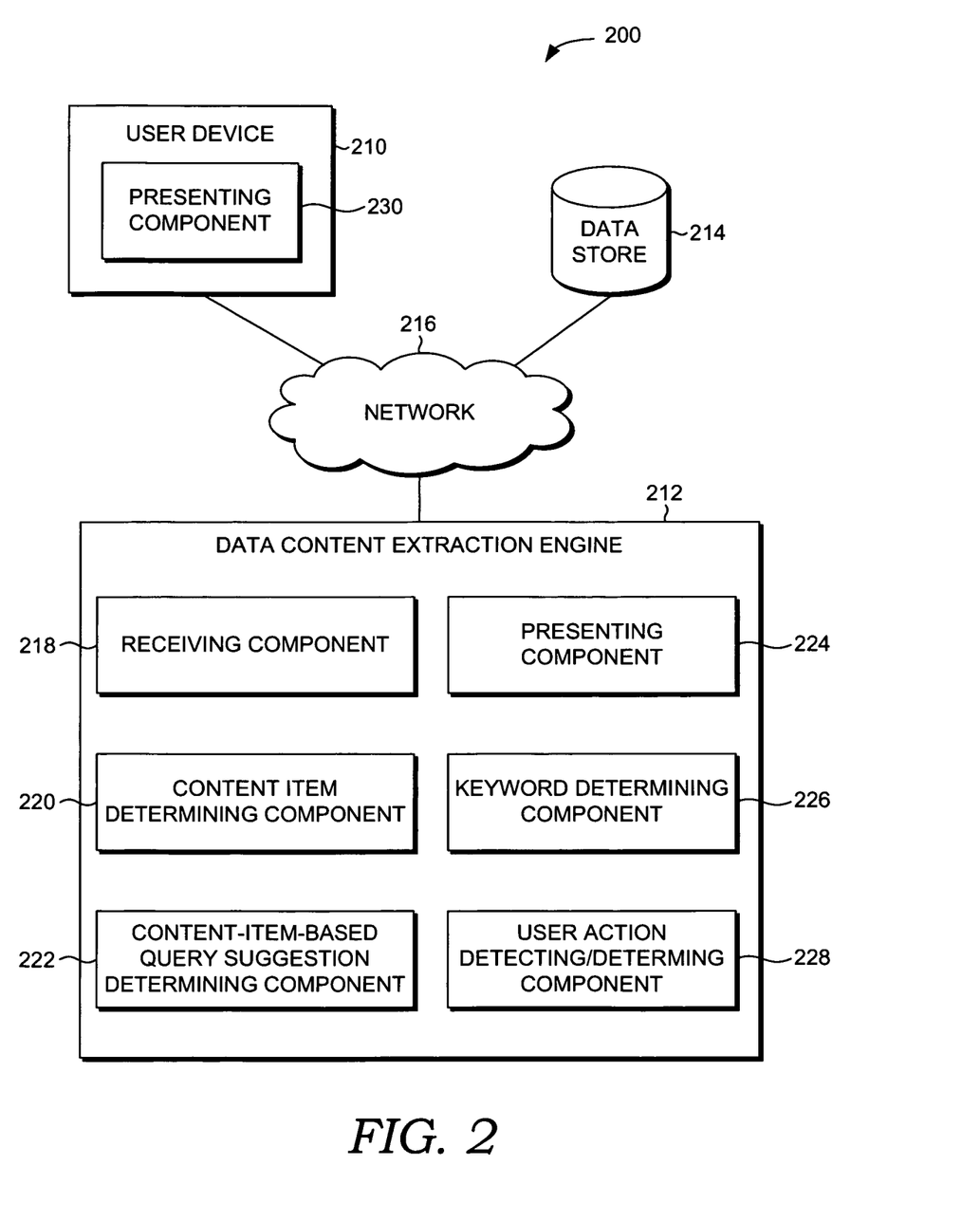
FIG. 2 is a block diagram of an exemplary computing system suitable for determining and presenting content-item-based query suggestions, in accordance with an embodiment of the present invention.

Turning now to FIG. 2, a block diagram is illustrated, in accordance with an embodiment of the present invention, showing a system 200 configured to determine and present query suggestions that are based upon content items, for instance, search query result items, advertisements, query-based query suggestions, or other informational content items. Query suggestions may also be based on any portion of a content item (e.g., keywords or phrases within the caption for a search result item, keywords or phrases within advertisements associated with a web page, etc.) or combination thereof. Content-item-based query suggestions are suggested queries, based upon one or more particular content items associated with a web page (or other information source page, e.g., client or mobile application page, and the like) and not solely on an originally input search query, that may lead to something (e.g., a search result or other content item) in which a user may be interested.

It will be understood and appreciated by those of ordinary skill in the art that the content-item-based query suggestion system 200 shown in FIG. 2 is merely an example of one suitable computing system environment and is not intended to suggest any limitation as to the scope of use or functionality of embodiments of the present invention. Neither should the system 200 be interpreted as having any dependency or requirement related to any single component or combination of components illustrated therein. Further, the system 200 may be provided as a stand-alone product, as part of a software development environment, or any combination thereof.

The system 200 includes a user device 210, a query suggestion engine 212, and a data store 214 all in communication with one another via a network 216. The network 216 may include, without limitation, one or more local area networks (LANs) and/or wide area networks (WANs). Such networking environments are commonplace in offices, enterprisewide computer networks, intranets, and the Internet. Accordingly, the network 216 is not further described herein.

The data store 214 is configured to store information related to query suggestions. In various embodiments, such information may include, without limitation, historical data regarding previously received search queries, query-based query suggestions, content-item based query suggestions, metadata and keywords related to particular consumer products and services, user interface configuration templates, and the like. In embodiments, the data store 214 is configured to be searchable for one or more of the items stored in association therewith. It will be understood and appreciated by those of ordinary skill in the art that the information stored in the data store 214 may be configurable and may include any information relevant to content-item-based query suggestions. The content and volume of such information are not intended to limit the scope of embodiments of the present invention in any way. Further, though illustrated as a single, independent component, data store 214 may, in fact, be a plurality of data stores, for instance, a database cluster, portions of which may reside on the user device 210, the query suggestion engine 212, another external computing device (not shown), and/or any combination thereof.

Each of the computing device 210 and the query suggestion engine 212 shown in FIG. 2 may be any type of computing device, such as, for example, computing device 100 described above with reference to FIG. 1. By way of example only and not limitation, each of the computing device 210 and the query suggestion engine 212 may be a personal computer, desktop computer, laptop computer, handheld device, mobile handset, consumer electronic device, and the like. Additionally, the user device 210 may further include a keyboard, keypad, stylus, joystick, and any other input-initiating component that allows a user to provide wired or wireless data to the network 216, e.g., search queries, web page addresses, and the like. It should be noted, however, that the present invention is not limited to implementation on such computing devices, but may be implemented on any of a variety of different types of computing devices within the scope of embodiments hereof.

As shown in FIG. 2, the query suggestion engine 212 is configured to receive web pages having content items associated therewith and to determine query suggestions based upon the associated content items. The query suggestion engine 212 includes a receiving component 218, a content item determining component 220, a content-item-based query suggestion determining component 222, a presenting component 224, a keyword determining component 226, and a user action determining component 228. In some embodiments, one or more of the illustrated components 218, 220, 222, 224, 226, and 228 may be implemented as stand-alone applications. In other embodiments, one or more of the illustrated components 218, 220, 222 224, 226, and 228 may be integrated directly into the operating system of the query suggestion engine 212 and/or the user device 210. It will be understood by those of ordinary skill in the art that the components 218, 220, 222, 224, 226, and 228 illustrated in FIG. 2 are exemplary in nature and in number and should not be construed as limiting. Any number of components may be employed to achieve the desired functionality within the scope of embodiments of the present invention.

The receiving component 218 is configured for receiving requests for information, for instance, a user request for presentation of a particular web page, a user-input search query, and the like. Upon receiving a request for information, the receiving component is configured to transmit such request, for instance, to data store 214, whereupon a resultant web page responding to the input request is returned to the receiving component 218. In this regard, the receiving component 218 is configured for receiving web pages, each web page generally having a plurality of content items associated therewith. By way of example only, in one embodiment, at least a portion of the plurality of content items are search query result items. In this instance, the receiving component 218 may receive a search query input by a user, for instance, a user associated with user device 210. Upon receiving the search query, the receiving component 218 may transmit the request for information (that is, the search query), to data store 214, whereupon a plurality of search results, each representing a content item, is returned to the receiving component 218. In embodiments, when the plurality of search result items is returned, a search results web page including the plurality of search result items is returned to receiving component 218. In addition to search result items, in embodiments, one or more of the plurality of content items may be an advertisement, a query-based query suggestion, or any combination thereof.

In embodiments, rather than transmitting requests for information directly from the receiving component 218 to the data store 214, a received request for information may be transmitted through the content item determining component 220. In this regard, the content item determining component 220 is configured for receiving requests for information from the receiving component 218 and for transmitting such requests, for instance, to data store 214, whereupon a resultant web page responding to the input request is returned to the content item determining component 220 which, in turn, transmits the resultant web page responding to the input request to the receiving component 218. It will be understood by those of ordinary skill in the art that the illustrated receiving component 218 and content item determining component 220 work closely with one another to receive input user requests for information and to query one or more data stores (for instance, data store 214) for information in response to received requests for information. The functionality of these components is, accordingly, closely intertwined and certain features thereof may be performed by either component exclusively or a combination of the two components 218, 220. Additionally, the functionality may be combined into a single component, if desired. Any and all such variations are contemplated to be within the scope of embodiments of the present invention.

The content-item-based query suggestion determining component 222 is configured for determining at least one query suggestion based upon at least one content item received in response to a user input request for information. Generally, a content-item-based query suggestion is determined by the content-item-based query suggestion determining component 222 based upon a single received content item, for instance, a single search result item, a single advertisement, or the like. However, in embodiments, a content-item-based query suggestion may be determined based on a plurality of received content items so long as the number of content items upon which the content-item-based query suggestion is based is fewer than all content items returned. That is, content-item-based query suggestions are differentiated from query-based query suggestions wherein the query-based query suggestions are based upon a user input search query and, accordingly, are relevant to all displayed content items on the resultant web page rather than being derived in response to a particular content item itself.

The presenting component 224 is configured for presenting the plurality of content items (and/or the web page in association with which the content items are to be presented) in association with the determined content-item-based query suggestion(s) to the user. In this regard, the presenting component 224 is configured for receiving the content items determined in response to the user input request for information (e.g., from receiving component 218 and/or content item determining component 220) and the determined content-item-based query suggestions (e.g., from content-item-based query suggestion determining component 222) and for transmitting such content items and associated content-item-based query suggestions to a corresponding presenting component 230 associated with the user device 210. The presenting component 230 associated with the user device 210 is accordingly configured to receive the content items and associated content-item-based query suggestions from presenting component 224 of the query suggestion engine 212 and for presenting (e.g., displaying) such content items and content-item-based query suggestions to the user. The presenting component 230 of the user device 210 may present the suggestions utilizing a variety of different user interface components, several of which are described more fully below.

Often times, a content item returned in response to a user input request for information will include a textual description associated therewith. For instance, one or more search result items may be returned as content items in response to a user input search query, and each of the search result items may have a textual description associated therewith that enables the user, at quick glance, to evaluate the relevance of the content associated with the search result item to their intended information request. Particular words or phrases included within the textual description may be more useful than others for determining content-item-based query suggestions. Further, words or phrases that may be most useful for determining content-item-based query suggestions may not be included within the textual description associated with a particular content item at all. In this regard, the keyword determining component 226 of the query suggestion engine 212 is configured for receiving textual descriptions that are associated with particular content items (for instance, from data store 214) and for determining at least one keyword relevant to the particular content item that is useful for determining content-item-based query suggestions relevant to the content item. Such keyword (which may include a single word, a phrase, or any other alpha-numeric character string) may already be included as part of the textual description, may be relevant to the content item but not included as part of the textual description associated with the content item that is returned (for instance, from data store 214) in response to the user request for information, or a combination thereof.

The keyword determining component 226 is further configured for providing the determined keyword to the content-item-based query suggestion determining component 222. In this embodiment, the content-item-based query suggestion determining component 222 is further configured for receiving the determined keyword from the keyword determining component 226 and for utilizing the received keyword in determining content-item-based query suggestions associated with the corresponding content item. The content-item-based query suggestion determining component 222 may then provide the keyword as at least a portion of the textual description associated with the corresponding content item to the presenting component 224 for presentation to the user. A variety of user interface components may be utilized by presenting components 224 and 230 to indicate to the user that the keyword includes content-item-based query suggestions associated therewith, several of which are described more fully herein below.

As more fully described below, content-item-based query suggestions may be presented in association with the corresponding content item upon presentation of the web page presented in response to the user request for information, may be presented only upon detection of particular user actions, or any combination thereof. In embodiments wherein presentation is conditioned upon detection of a particular user action, the user action determining component 228 is configured for determining if one or more user-driven conditions (e.g., user actions) have been met prior to the presenting components 224 and 230 presenting the determined content-item-based query suggestion(s). In this regard, the user action determining component 228 is configured to detect and/or receive input of user actions and to determine if the detected/received user actions satisfy one or more actions upon which presentation is conditioned. Exemplary user actions may include, without limitation, a hover over at least a portion of a content item, a scrolling action with respect to the web page in association with which content items are presented, a scrolling action with respect to a particular presented content item, a selection of a selectable portion of a content item, a hover over a content-item query suggestion indicator associated with one or more presented content items (more fully described below), a selection of a content-item query suggestion indicator associated with one or more presented content items, or any combination thereof. Upon detection of a user action upon which presentation of one or more content-item-based query suggestions is conditioned, the user action determining component 228 is further configured to provide an indication to the presenting component 224 that presentation is to be initiated. Accordingly, the content-item-based query suggestion(s) are dynamically presented in response to the detected user action.

Figure 3:
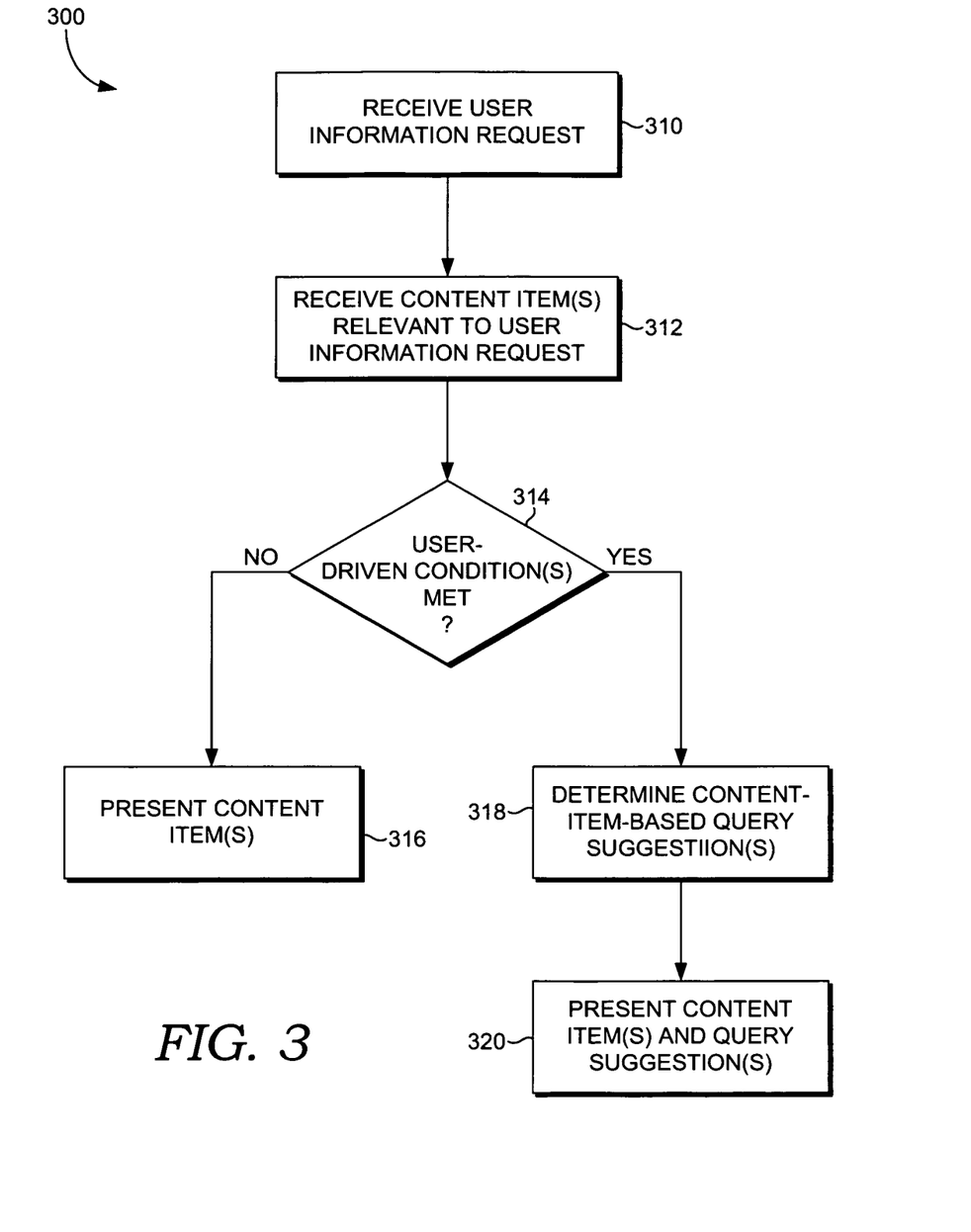
FIG. 3 is a flow diagram showing a method for determining and presenting content-item-based query suggestions, in accordance with an embodiment of the present invention.

Turning now to FIG. 3, a flow diagram is illustrated which shows a method 300 for determining and presenting content-item-based query suggestions, in accordance with an embodiment of the present invention. Initially, as indicated at block 310, a request for user information (for instance, a web page address, a search query, or the like) is received, e.g., utilizing receiving component 218 of FIG. 2. Subsequently, one or more content items relevant to the user's information request are received, as indicated at block 312. As previously described, such content items may be received, by way of example only, upon the receiving component 218 of FIG. 2 directly querying the data store 214, may be received from content item determining component 220, or any combination thereof.

Next, as indicated at block 314, it is determined whether any user actions upon which presentation of content-item-based query suggestions is conditioned have been detected, for instance, utilizing user action determining component 228 of FIG. 2. If no user actions upon which presentation of content-item-based query suggestions is conditioned have been detected, the content items are presented to the user, for instance, utilizing presenting components 224 and 230 of FIG. 2. This is indicated at block 316. As previously described, exemplary user actions may include, without limitation, a hover over at least a portion of a content item, a scrolling action with respect to the web page in association with which content items are presented, a scrolling action with respect to a particular presented content item, a selection of a selectable portion of a content item, a hover over a content-item query suggestion indicator associated with one or more presented content items (more fully described below), a selection of a content-item query suggestion indicator associated with one or more presented content items, or any combination thereof. If, however, one or more user actions upon which presentation of content-item-based query suggestions is conditioned have been detected, one or more content-item-based query suggestions is subsequently determined (for instance, utilizing content-item-based query suggestion determining component 222 of FIG. 2), as indicated at block 318. Next, the received content item(s) and any corresponding content-item-based query suggestions are subsequently presented, for instance, utilizing presenting components 224 and 230 of FIG. 2. This is indicated at block 320.

It will be understood by those of ordinary skill in the art that the order of steps shown in the method 300 of FIG. 3 are not meant to limit the scope of the present invention in any way and, in fact, the steps may occur in a variety of different sequences within embodiments hereof. For instance, the content-item-based query suggestions may be determined (shown at step 318 of FIG. 3) prior to determining if any user-driven conditions have been met (shown at step 314 of FIG. 3). In such an embodiment, the content-item-based query suggestions may be cached or otherwise hidden from presentation until such time as the user actions upon which presentation is conditioned are detected and/or determined. Any and all such variations, and any combination thereof, are contemplated to be within the scope of embodiments of the present invention.

As previously mentioned, content-item-based query suggestions may be presented utilizing a variety of user interface features. Such features may include, by way of example only, novel user interface elements presented with respect to a web (or other source) page, exposing content-item-based query suggestions when a particular content item is hovered over, or embedding links in particular content items associated with a web (or other source) page that, when clicked, will issue a query. Without limitation, a number of user interface features are described herein below with reference to FIGS. 4-8. It will be understood by those of ordinary skill in the art that a number of other user interface features may be utilized to expose and/or present content-item-based query suggestions in accordance with embodiments hereof and that the user interface features shown in FIGS. 4-8 are meant to be merely illustrative of some such features.

Figure 4:
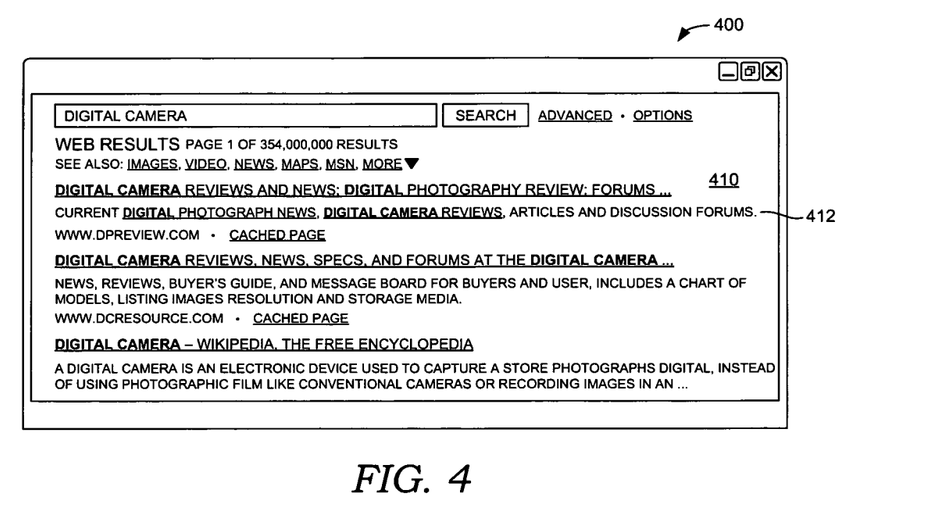
FIG. 4 is an illustrative screen display, in accordance with an embodiment of the present invention, of an exemplary user interface showing keywords indicated as having associated content-item-based query suggestions presented within the textual description of a search result item, such indication being by virtue of an underlined keyword or phrase within the description thereof.

With reference to FIG. 4, an illustrative screen display is shown, in accordance with an embodiment of the present invention, of an exemplary user interface 400 showing keywords indicated as having associated content-item-based query suggestions presented within the textual description of a search result item. In the illustrated user interface 400, such indication is by virtue of an underlined keyword or phrase within the description thereof that, when selected by a user, will link to another search result page issued with the underlined keyword or phrase being input as the search query. This user interface feature is particularly useful as it permits the presentation of content-item-based query suggestions without taking up screen real estate on the web (or other source) page.

More particularly, the user interface 400 shown in FIG. 4 includes a content item display area 410 and a content-item-based query suggestion display area 412. The content-item-based query suggestion display area 412 includes content-item-based query suggestions (e.g., "digital photograph news", "digital camera reviews") included within the textual description associated with a search result item that was returned in response to the search query, "digital camera". The content-item-based query suggestions are determined (for instance, utilizing content-item-based query suggestion determining component 222 of FIG. 2) by evaluating all keywords or phrases included in the textual description and discerning which keywords or phrases within the textual description associated with a particular content item (e.g., search result item) would serve as "good" suggestions for the surrounding content. In embodiments, the textual description may be modified to increase the likelihood of showing content-item-based query suggestions in the textual description that will be most useful, as well as to get a variety of queries across the textual descriptions for all content items on the web page.

Each content-item-based query suggestion within the textual description is a link to another search results page that will be rendered with the content-item-based query suggestion as the search query. Further, each content-item-based query suggestion in this illustration is determined based upon the content item (i.e., the search result item described by the heading "digital camera reviews and news: digital photography review: forums . . . ") and, accordingly, is related to that content item rather than the input search query.

Figure 5:
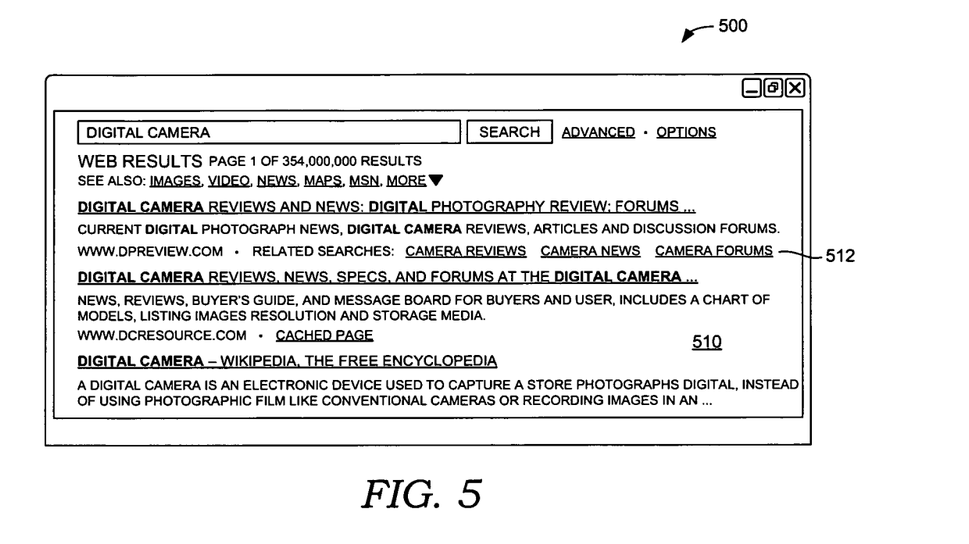
FIG. 5 is an illustrative screen display, in accordance with an embodiment of the present invention, of an exemplary user interface showing content-item-based query suggestions in line with the textual description associated with a search result item.

With reference to FIG. 5, an illustrative screen display is shown, in accordance with an embodiment of the present invention, of an exemplary user interface 500 showing content-item-based query suggestions in line with the textual description associated with a search result item. More particularly, the user interface 500 shown in FIG. 5 includes a content item display area 510 displaying a plurality of search result items (content items) returned in response to a user-initiated search query, "digital camera". The user interface 500 also includes a content-item-based query suggestion display area 512 for displaying content-item-based query suggestions in line with the textual description of a content item (i.e., search results). As with the user interface feature set forth in FIG. 4, this user interface feature is particularly useful as it permits the presentation of content-item-based query suggestions without taking up screen real estate on the web (or other source) page. Each in-line content-item-based query suggestion is underlined indicating it is a link to another search results page that will be rendered with the content-item-based query suggestion as the search query. Further, each content-item-based query suggestion shown in association with the user interface 500 is determined based upon the content item (i.e., the search result item described by the heading "digital camera reviews and news: digital photography review: forums . . . ") and, accordingly, is related to that content item rather than the input search query.

When adding static content-item-based query suggestions to a web (or other source) page, as illustrated in FIGS. 4 and 5, the determination regarding what content-item-based query suggestions to utilize and where to place them is generally made when the server that generates the web (or other source) page receives the HTML request. When generating the HTML for the web (or other source) page, the content-item-based query suggestions are added in line or as selectable links, as described herein above.

Figure 6:
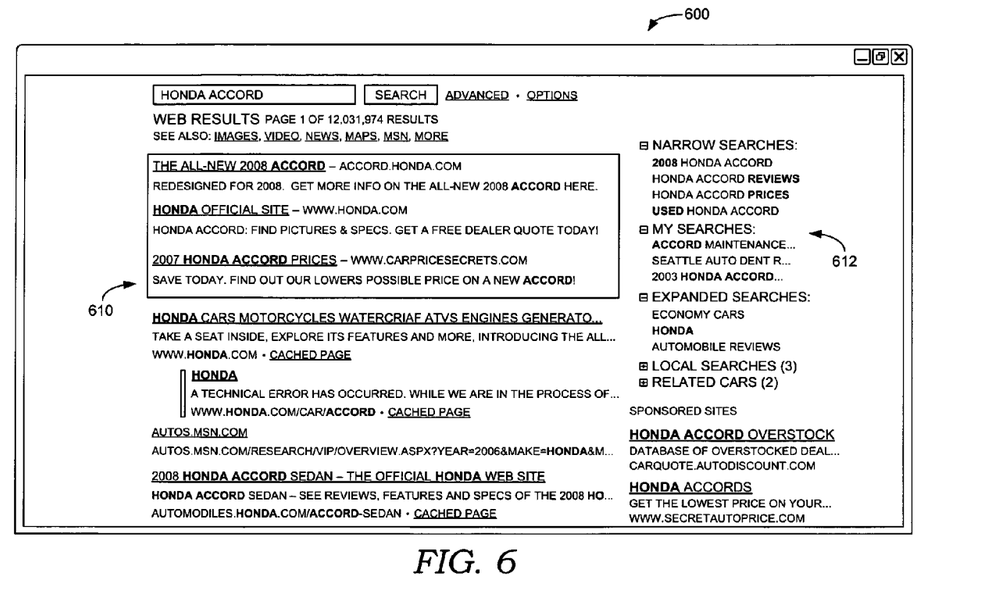
FIG. 6 is an illustrative screen display, in accordance with an embodiment of the present invention, of an exemplary user interface showing a content-item-based query suggestions display area to the right of the content item display area.
Figure 7:
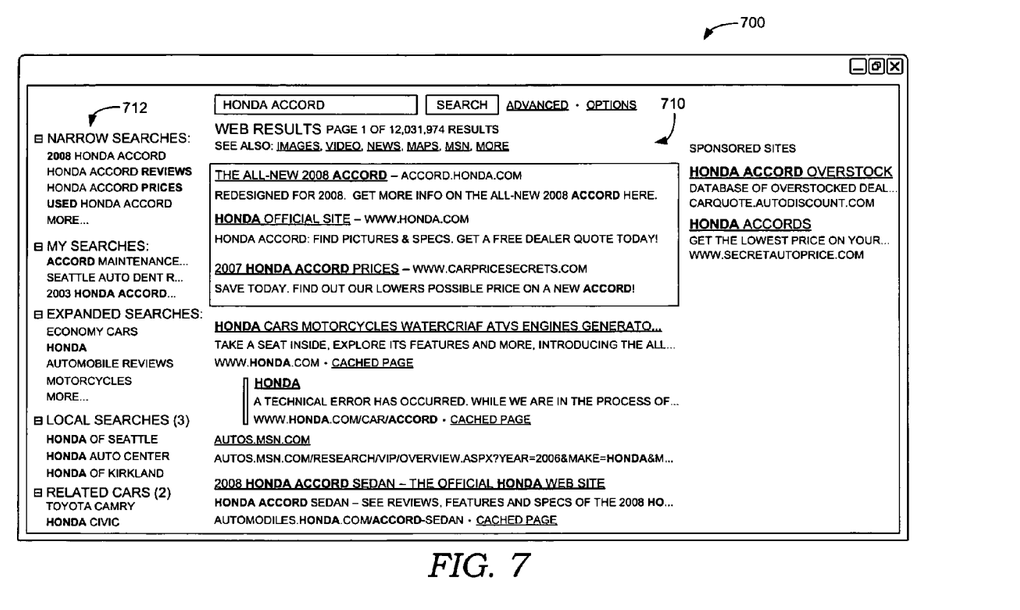
FIG. 7 is an illustrative screen display, in accordance with an embodiment of the present invention, of an exemplary user interface showing a content-item-based query suggestions display area to the left of the content item display area.

Another user interface feature for presenting content-item-based query suggestions in association with web (or other source) pages is to present a content-item-based query suggestion indicator in association with a content item but keep the corresponding content-item-based query suggestions hidden from the user until the user performs a particular action with respect to the query suggestion indicator. Examples of this user interface feature are shown in FIGS. 6 and 7. With initial reference to FIG. 6, an illustrative screen display is shown, in accordance with an embodiment of the present invention, of an exemplary user interface 600 showing a content-item-based query suggestions display area 612 to the right of a content item display area 610. Within the content-item-based query suggestion display area 612 are a number of bolded keywords, e.g., "2008", "reviews", "prices", etc. Each of the bolded keywords in the illustrated embodiment represents a suggestion indicator. Upon detection or determination of a particular user action with respect to the suggestion indicator, a box may be exposed that contains content-item-based query suggestions related to the subject content item. Upon ceasing the user action, the box may again be hidden from the user's view.

As previously set forth, detectable user actions may include, without limitation, a hover over at least a portion of a content item, a scrolling action with respect to the web page in association with which content items are presented, a scrolling action with respect to a particular presented content item, a selection of a selectable portion of a content item, a hover over a content-item query suggestion indicator associated with one or more presented content items, a selection of a content-item query suggestion indicator associated with one or more presented content items, or any combination thereof. In this regard, it should be noted that content-item-based query suggestions may be hidden from view and exposed upon detection of user action even absent a suggestion indicator. For instance, content-item-based query suggestions may be exposed upon a hover over a portion of a content item even if there is no visible indication that content-item-based query suggestions related to that content item are available. Any and all such variations are contemplated to be within the scope of embodiments of the present invention.

With reference to FIG. 7, an illustrative screen display is shown, in accordance with an embodiment of the present invention, of an exemplary user interface 700 showing a content-item-based query suggestions display area 712 to the left of the content item display area 710. As with FIG. 6, within the content-item-based query suggestion display area 712 are a number of bolded keywords, e.g., "2008", "reviews", "prices", etc. Each of the bolded keywords in the illustrated embodiment represents a suggestion indicator. Upon detection or determination of a particular user action with respect to the suggestion indicator, a box may be exposed that contains content-item-based query suggestions related to the subject content item. Upon ceasing the user action, the box may again be hidden from the user's view.

User interface features as shown in FIGS. 6 and 7 may be implemented in a couple of different ways. For instance, the content-item-based query suggestions may be written into the HTML, either as HTML elements or as a JavaScript object that remains hidden until it is determined that a particular user-driven condition has been met that indicates the content-item-based query suggestions are to be exposed. However, when there are a large number of content items on a page for which content-item-based query suggestions may be desired, it may not be efficient to embed all of the query suggestions within the page. In this case, once a user performs a particular action that is a pre-condition to exposure and that indicates that content-item-based query suggestions are desired for an individual content item, an asynchronous request may be made to the hosting site for the content-item-based query suggestions, which are then displayed dynamically. It will be understood by those of ordinary skill in the art that other implementations may be possible and that embodiments hereof are not intended to be limited to any particular implementation method or process.

Figure 8:
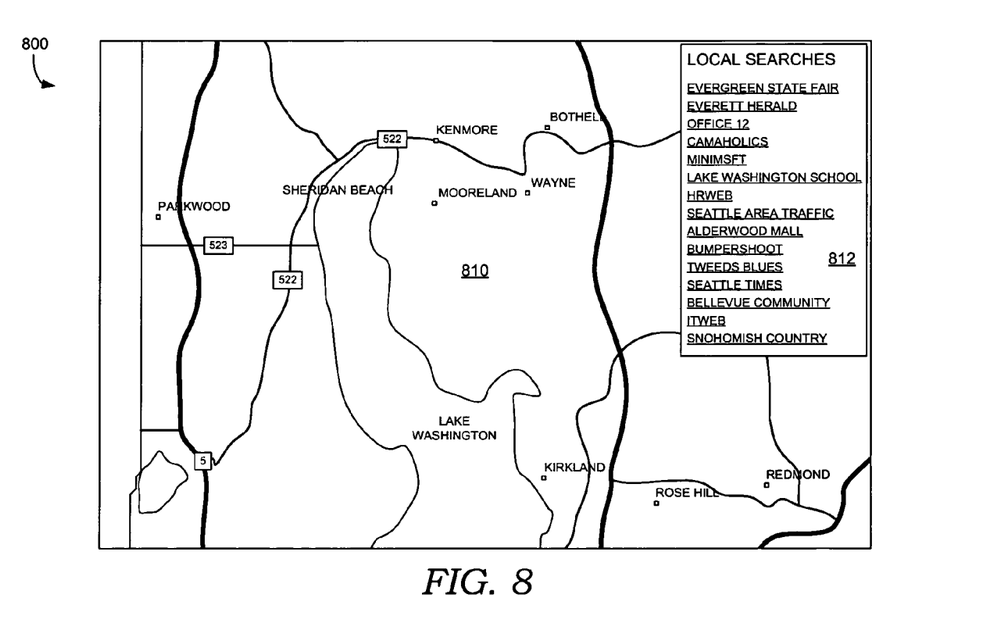
FIG. 8 is an illustrative screen display of an exemplary user interface showing a static query suggestion display area, the content of which is capable of being dynamically exposed in response to user action, in accordance with an embodiment of the present invention.

Another user interface feature for presenting content-item-based query suggestions in association with web (or other source) pages is to present a statically-located content-item-based query suggestion display area with respect to the content item display area. An exemplary such embodiment is shown in FIG. 8. More particularly, FIG. 8 is an illustrative screen display, in accordance with an embodiment of the present invention, of an exemplary user interface 800 showing a statically-located query suggestion display area 812 in association with the content item display area 810. In the illustrated user interface 800, the content item displayed in association with the content item display area 810 is a map of particular region of a city and the content-item-based query suggestion display area 812 is a window that overlays the map in the upper right-hand corner thereof. The content-item-based query suggestions displayed in association with the statically-located content-item-based query suggestion display area 812 are capable of being dynamically exposed in response to user action. Thus, for instance, as the user moves a mouse or scrolls around the map content, query suggestions determined based upon the focused portion of the content item (map) may be displayed in association with the content-item-based query suggestion display area 812. That is, the query suggestions displayed in association with the content-item-based query suggestion display area 812 are dynamically updated to reflect the changing context of the map.

The user interface feature illustrated in FIG. 8, that is, a statically-located content-item-based query suggestion display area that is dynamically populated with query suggestions based upon the content item(s) displayed in association with the content item display area, may be implemented in a couple of different ways. For instance, the statically-located content-item-based query suggestion display area may be part of the web page for which query suggestions are desired. In this case, the user interface components that contain the content-item-based query suggestions are added just as any other web page content may be added. As above, with reference to FIGS. 6 and 7, as a user interacts with the page, asynchronous requests may be made to a server that responds with the content-item-based query suggestions to be presented. Alternatively, this user interface feature may be built into a web browser or web browser plug in. In this case, content-item-based query suggestions could be provided for all web pages. The actual web page is not modified, but rather the content being displayed in a location surrounding the web page (e.g., above, beside, etc.) is modified. It will be understood by those of ordinary skill in the art that other implementations may be possible and that embodiments hereof are not intended to be limited to any particular implementation method or process.

It should be noted that this user interface feature may be readily extended to other types of web (or other source) pages beyond maps. That it, this user interface feature may be utilized on any web (or other source) page to show content-item-based query suggestions when a user interacts with or views a particular content item. For instance, as a user scrolls down a web (or other source) page, the query suggestions would change to reflect the content item(s) visible at that time. As the user moves their mouse around and hovers over or otherwise interacts with content items on a page, query suggestions relevant to the particular content item(s) may be displayed. Additionally, as an audio, video, or multimedia content item is played, query suggestions based upon the content being heard and/or viewed may be displayed and changed as the media content item progresses. Even if a user scrolls down, the content-item-based query suggestion display area would stay visible in, for instance, the upper right-hand corner of the user interface as if it is floating over the page. The content-item-based query suggestion display area could be moveable or closable as well to allow the user to have control over where the suggestions are displayed on the page. If desired, the content-item-based query suggestion display area may also be translucent so that the underlying web (or other source) page can be viewed.

As can be understood, embodiments of the present invention provide systems and methods for determining query suggestions based upon content items. Content items may include, without limitation, a search query result item, e.g., displayed on a search results web page, an advertisement, and a query-based query suggestion. Further embodiments of the present invention provide user interface features for presenting content-item-based query suggestions in association with a web page. If desired, content-item-based query suggestions may be dynamically exposed in response to a user action, for instance, in response to a user hovering over a portion of the associated content item for at least a predetermined period of time. Additionally, if desired, query suggestions may be provided for any web page with the functionality being built into either a web browser or a web browser plug-in such as a search toolbar. As the user browses through any page on the web, suggestions for the content the user is interacting with can be displayed utilizing any combination of user interface features described herein above.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. One or more computer-storage media having computer-executable instructions embodied thereon that, when executed, perform a method for presenting query suggestions based upon content items, the method comprising:
   receiving a web page having a plurality of content items associated therewith, the plurality of content items being received in response to a request for information;
   displaying the plurality of content items;
   determining that one or more user-driven conditions are met, the one or more user-driven conditions being met based on detecting one or more user actions associated with the received web page or the displayed plurality of content items;
   determining, by a computing device having a processor and a memory, at least one query suggestion based upon fewer than all of the plurality of content items associated with the web page, wherein the query suggestion is selectable to cause a search query that is based on the query suggestion to be executed, the fewer than all of the plurality of content items being selected based on the one or more user-driven conditions; and
   presenting, responsive to determining the one or more user-driven conditions are met, the determined at least one query suggestion in a content item-based query suggestion display area while displaying the plurality of content, wherein the presentation indicates that the at least one query suggestion is relevant to at least one of, but not all of, the displayed plurality of content items, the content item-based query suggestion display area is statically-located relative to the web page, and the at least one query suggestion presented in the content item-based query suggestion display area is dynamically selected in response to user action.

2. The one or more computer-storage media of claim 1, wherein at least one of the plurality of content items comprises one of a search query result item, an advertisement and a query-based query suggestion, and wherein the query-based query suggestion is based only upon an input search query.

3. The one or more computer-storage media of claim 1, wherein the request for information is a received search query, and wherein, in response to the received search query, the method further comprises presenting the web page having the plurality of content items associated therewith.

4. The one or more computer-storage media of claim 3, wherein at least one of the plurality of content items comprises a search query result item, and wherein the search query result item includes a textual description associated therewith.

5. The one or more computer-storage media of claim 4, wherein the method further comprises:
   determining at least one keyword relevant to the search query result item for which search query suggestions are capable of being presented; and
   presenting the at least one keyword as at least a portion of the textual description associated with the search query result item.

6. The one or more computer-storage media of claim 1, wherein at least one of the one or more user-driven conditions includes one of a hover over at least a portion of one of the plurality of content items, a scrolling action with respect to the received web page, a scrolling action with respect to one of the plurality of content items associated with the web page, a selection of one of the plurality of content items, a selection of a selectable portion of one of the plurality of content items, a hover over a content item query suggestion indicator associated with at least one of the plurality of content items, a selection of a content item query suggestion indicator associated with at least one of the plurality of content items, play initiation of a media content item, and a combination thereof.

7. The one or more computer-storage media of claim 1, wherein determining the at least one query suggestion based upon fewer than all of the plurality of content items associated with the web page comprises determining the at least one query suggestion based upon at least a portion of a particular one of the plurality of content items associated with the web page.

8. The one or more computer-storage media of claim 7, wherein the particular one of the plurality of content items includes a textual description associated therewith, the textual description comprising one or more keywords,
   and wherein determining the at least one query suggestion based upon at least the portion of the particular one of the plurality of content items associated with the web page comprises determining the at least one query suggestion based upon at least one of the one or more keywords comprising the textual description.

9. A user interface embodied on one or more computer-storage media, the user interface for presenting content item-based query suggestions in association with a web page, the user interface comprising:
   a content item display area that displays a plurality of content items; and
   a content item-based query suggestion display area that displays one or more content item-based query suggestions relevant to a particular one of the displayed plurality of content items or a portion thereof, wherein the one or more query suggestions are derived in response to the particular one of the plurality of content items and are selectable to cause a search query that is based on the query suggestion to be executed, the one or more content item-based query suggestions being displayed in response to a user action associated with the particular one of the displayed plurality of content items, the one or more content item-based query suggestions being displayed while displaying the plurality of content items, the display indicating that the one or more content item-based query suggestions are relevant to at least one of, but not all of, the displayed plurality of content items;

wherein the content item-based query suggestion display area is statically-located relative to the web page, and the one or more content item-based query suggestions displayed in association with the content item-based query suggestion display area are dynamically selected in response to user action.

10. The user interface of claim 9, wherein the content item-based query suggestion display area is dynamically exposed in response to user action.

11. The user interface of claim 9, wherein the user action includes one of a hover over at least a portion of one of the plurality of content items, a scrolling action with respect to the web page, a scrolling action with respect to one of the plurality of content items associated with the web page, a selection of one of the plurality of content items, a selection of a selectable portion of one of the plurality of content items, and a combination thereof.

12. The user interface of claim 9, further comprising a content item-based query suggestion indicator associated with at least one of the plurality of displayed content items.

13. The user interface of claim 12, wherein the content item-based query suggestion display area is dynamically exposed in response to user action comprising one of a hover over at least a portion of one of the plurality of content items, a scrolling action with respect to the web page, a scrolling action with respect to one of the plurality of content items associated with the web page, a selection of one of the plurality of content items, a selection of a selectable portion of one of the plurality of content items, a hover over the content item-based query suggestion indicator associated with at least one of the plurality of displayed content items, a selection of the content item-based query suggestion indicator associated with at least one of the plurality of displayed content items, play initiation of a media content item, and a combination thereof.

14. The user interface of claim 9, wherein at least one of the plurality of displayed content items is a search result item having a selectable indicator within a textual description associated therewith, and wherein the content item-based query suggestion display area is dynamically displayed upon user selection of the selectable indicator.

15. The user interface of claim 9, wherein the content item based query suggestion display area comprises a specific content item-based query suggestion display area associated with each of the plurality of content items displayed in the content item display area, and wherein each specific content item-based query suggestion display area displays at least one specific content item-based query suggestion relevant to the content item associated therewith.

16. The user interface of claim 9, wherein at least one of the plurality of content items displayed in the content item display area is a search result item, and wherein the one or more content item-based query suggestions displayed in the content item-based query suggestion display area are determined based upon the search result item.

17. The user interface of claim 9, wherein at least one of the plurality of content items displayed in the content item display area is an advertisement, and wherein the one or more content item-based query suggestions displayed in the content item-based query suggestion display area are determined based upon the advertisement.

18. A computerized method for presenting content item-based query suggestions, the method comprising:

receiving a first search query;

determining, by a first computing device having a processor and a memory, a first plurality of content items relevant to the received first search query, each of the first plurality of content items including one of a search result item, an advertisement, a query-based query suggestion, and a combination thereof;

providing the first plurality of content items for presentation;

determining, responsive to a user action, made while the presented first plurality of content items are being displayed and associated with a content item, but not all content items, from the presented first plurality of content items, at least one content item-based query suggestion based upon a particular one of the plurality of content items;

providing the first plurality of content items relevant to the received search query and the determined at least one content item-based query suggestion for presentation in association with one another, wherein the determined at least one content item-based query suggestion is provided for presentation in a content item-based query suggestion display area on a web page, the content item-based query suggestion display area is statically-located relative to the web page, and the determined at least one content item-based query suggestion presented in the content item-based query suggestion display area is dynamically selected in response to user action;

receiving a selection of the at least one content item-based query suggestion;

executing, by a second computing device having a processor and a memory, a second search based on the at least one content item-based query suggestion; and providing a second plurality of content items for presentation in a search engine results page, the second plurality of content items being associated with the at least one content item-based query suggestion, wherein the first and second computing devices are the same or different devices.

19. The computerized method of claim 18, wherein the content item that is associated with the user action is the particular one of the plurality of content items.

* * * * *